UNITED STATES PATENT OFFICE.

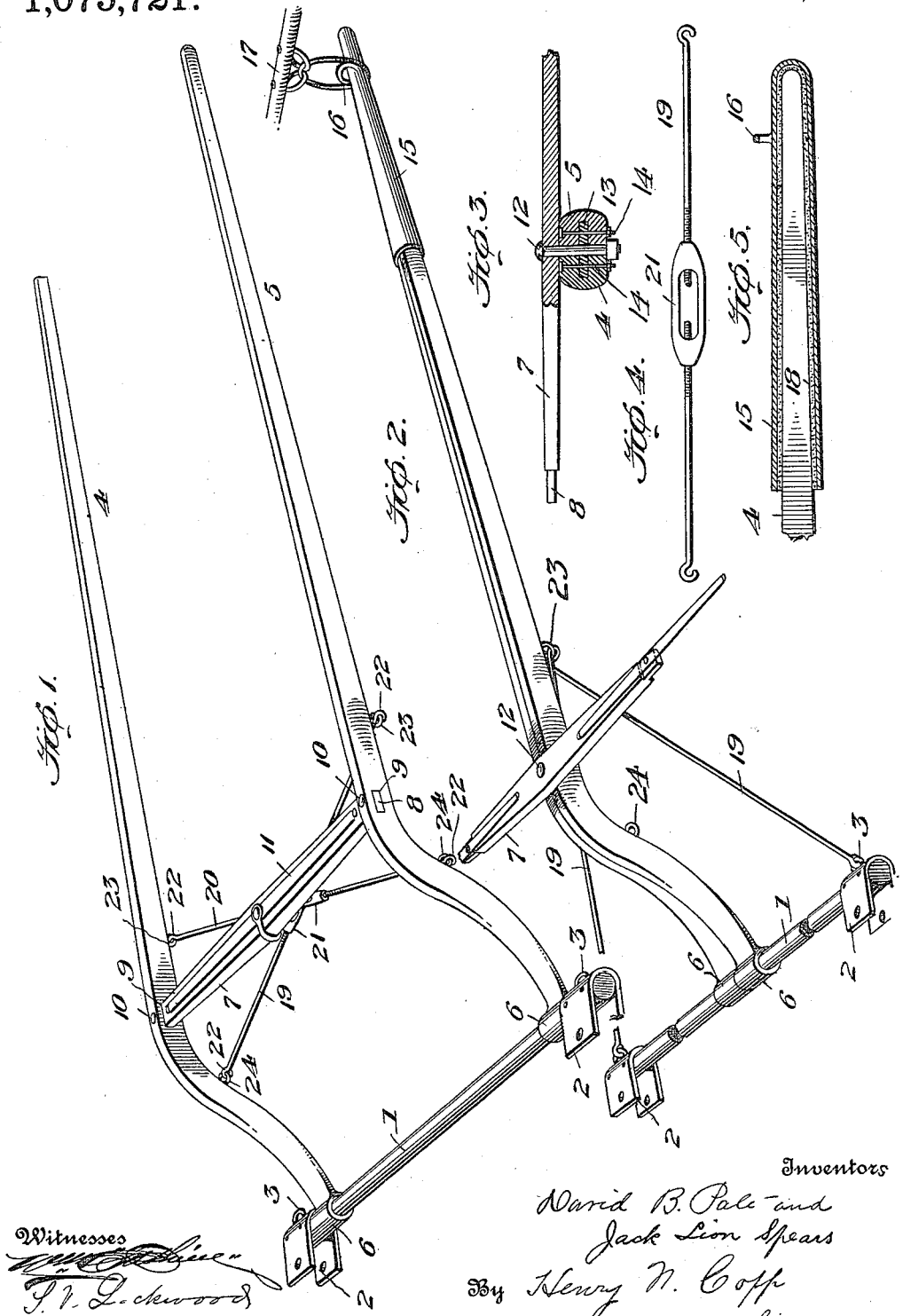

DAVID B. PATE AND JACK LION SPEARS, OF HORNBECK, LOUISIANA.

COMBINED CONVERTIBLE VEHICLE POLE AND SHAFTS.

1,075,721.

Specification of Letters Patent.

Patented Oct. 14, 1913.

Application filed September 3, 1912. Serial No. 718,282.

*To all whom it may concern:*

Be it known that we, DAVID B. PATE and JACK LION SPEARS, citizens of the United States, residing at Hornbeck, in the parish of Vernon and State of Louisiana, have invented certain new and useful Improvements in Combined Convertible Vehicle Poles and Shafts, of which the following is a specification.

This invention relates to combined convertible vehicle poles and shafts.

Our object is to provide a simple, strong and durable convertible vehicle tongue and shaft which may be quickly and easily converted from shafts adapted to be disposed on opposite sides of the animal to a center tongue adapted to be arranged between the animals of a team, thus permitting one or more horses to be hitched to the vehicle, as may be desired, without necessitating removal of any of the draft rigging.

Our invention embodies a draft bar, a pair of shafts adjustably connected thereto and adapted to be brought together to form a tongue, braces adapted to be connected to the shafts whether they are used as such or combined as a tongue, and a doubletree which is adapted to serve as such when the shafts are combined as a tongue or to constitute a brace between the shafts and used as a support for a swingletree when but one animal is employed.

The invention is fully set forth hereinafter and the novel features are recited in the appended claims.

In the accompanying drawings: Figure 1 is a perspective view of the invention when arranged for one horse; Fig. 2, a similar view with the shafts combined when used as a tongue; and Figs. 3, 4 and 5, detail views.

1 is a tubular draft bar which is connected to the front axle of the vehicle by clevises 2 of any preferred form. This draft bar at its ends has eye bolts 3.

The shafts 4 and 5 have flat inner faces so that they can be readily combined as a tongue and are provided with eyes or loops 6 at their heels which are slidable on the draft bar 1, thus permitting the shafts to be brought together to form a tongue or to be spread apart for use as shafts. A bar 7 has tenon ends 8 which are adapted to be received in sockets 9 in the shafts 4 and 5 when the latter are spaced apart, suitable bolts 10 serving to connect the tenons to the shafts. When thus arranged, a swingletree 11 may be mounted on the brace.

When the shafts 4 and 5 are brought together to form a tongue, the brace 7 is used as a doubletree and suitable swingletrees may be provided on the ends thereof for attachment to the traces of the two animals. The pivot bolt 12 which passes through the brace 7, also passes through a short connector 13 which is received in the sockets in the shafts 4 and 5 and held by pins or bolts 14. By this means the shafts which are combined as a tongue are securely held together at their heels and the brace 7 is mounted as a doubletree. The tips of the shafts are so formed as to receive a tapered metallic tip 15 which is provided with a member 16 to engage the ring of the neck-yoke 17. The pole tip holds the front ends of the shafts together so that the tongue or pole is secured at that end. Preferably, the interior of the pole tip is lined with some suitable material such as rubber 18 to afford a suitable frictional engagement and to prevent injury to the tips of the shafts.

We provide two brace rods 19 and 20 having turn-buckles 21 and provided with hooks 22 at their ends. On each shaft there are provided eye bolts 23 and 24.

When the shafts are arranged as a tongue or pole, the brace rods are engaged with the foremost eye bolts 23 and also with the eye bolts 3 on the draft bar 1. The shafts 4 and 5 are thus held against spreading, because the brace rods are crossed at their foremost ends before they are engaged with the eye bolts 23. Consequently, any tendency of the shafts to spread apart is resisted. The turn-buckles enable the tension to be made as great as desired.

If the shafts 4 and 5 are spread apart and used as shafts, the braces 19 and 20 are not engaged with the eye bolts 3, but have their ends engaged, respectively, with an eye bolt 24 on one shaft and an eye bolt 23 on another shaft so that the shafts mutually brace and strengthen each other.

Having thus described our invention, what we claim as new and desire to secure by Letters Patent, is:—

1. A draft rigging having a draft bar, shafts adapted to be arranged as such or to be combined to constitute a pole or tongue, braces detachably connected to the draft bar adapted for direct connection at both ends to the shafts if the latter are spaced apart and used as shafts and for connection to the draft bar for bracing the shafts if said shafts are brought together for use as a tongue or pole.

2. A draft rigging having a draft bar, shafts adapted to be arranged as such or to be combined to constitute a pole or tongue, a pair of hooks on each shaft, and releasable braces adapted to engage one of each set of hooks when the shafts are brought together for use as a tongue, said braces at the other end being then connected to the draft bar, and extending from one hook of each shaft to another hook of the other shaft when the shafts are spaced apart for use as such, whereby the shafts are then interbraced.

In testimony whereof, we hereunto affix our signatures in presence of two witnesses.

DAVID B. PATE.
JACK LION SPEARS.

Witnesses:
SALLIE HARRELL,
SIM STEWART.

Copies of this patent may be obtained for five cents each, by addressing the "Commissioner of Patents, Washington, D. C."